United States Patent
Che et al.

(10) Patent No.: US 12,360,653 B2
(45) Date of Patent: Jul. 15, 2025

(54) CONTROL DISPLAY METHOD AND APPARATUS, ELECTRONIC DEVICE, STORAGE MEDIUM, AND PROGRAM PRODUCT

(71) Applicant: Beijing Zitiao Network Technology Co., Ltd., Beijing (CN)

(72) Inventors: Wanli Che, Beijing (CN); Zhenan Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/753,723

(22) Filed: Jun. 25, 2024

(65) Prior Publication Data

US 2024/0345706 A1    Oct. 17, 2024

Related U.S. Application Data

(63) Continuation of application No. PCT/CN2023/080281, filed on Mar. 8, 2023.

(30) Foreign Application Priority Data

Mar. 21, 2022    (CN) .......................... 202210283956.1

(51) Int. Cl.
    *G06F 3/0483*        (2013.01)
    *G06F 3/04845*       (2022.01)

(52) U.S. Cl.
    CPC ........ *G06F 3/0483* (2013.01); *G06F 3/04845* (2013.01)

(58) Field of Classification Search
    None
    See application file for complete search history.

(56) References Cited

U.S. PATENT DOCUMENTS

| | | | |
|---|---|---|---|
| 11,265,275 B2 * | 3/2022 | Ryu | ................ G06F 16/583 |
| 2005/0283742 A1 | 12/2005 | Gusmorino et al. | |
| 2007/0214234 A1 | 9/2007 | Robinson et al. | |

(Continued)

FOREIGN PATENT DOCUMENTS

| | | |
|---|---|---|
| CN | 103927077 A | 7/2014 |
| CN | 110536005 A | 12/2019 |

(Continued)

OTHER PUBLICATIONS

ISA China National Intellectual Property Administration, International Search Report Issued in Application No. PCT/CN2023/080281, May 15, 2023, 10 pages. (Submitted with partial English translation).

(Continued)

*Primary Examiner* — Toan H Vu
(74) *Attorney, Agent, or Firm* — Alleman Hall & Tuttle LLP

(57) ABSTRACT

A display method of a control, an apparatus, an electronic device, and a storage medium are provided. The method includes: in response to a display operation for a target page, displaying the target page and displaying a target control in the target page; and in response to display of the target control in the target page, displaying an associated control of the target control in the target page, wherein at least two associated pictures are displayed in at least one associated control.

10 Claims, 5 Drawing Sheets

(56) References Cited

U.S. PATENT DOCUMENTS

| | | | |
|---|---|---|---|
| 2014/0132537 A1 | 5/2014 | Muroi | |
| 2018/0348992 A1* | 12/2018 | Ku | ............... G06F 3/04847 |
| 2019/0179526 A1* | 6/2019 | Yellen | ............... G11B 27/00 |
| 2022/0004286 A1 | 1/2022 | Alldredge et al. | |

FOREIGN PATENT DOCUMENTS

| | | | |
|---|---|---|---|
| CN | 111182345 A | 5/2020 |
| CN | 112135059 A | 12/2020 |
| CN | 112486390 A | 3/2021 |
| CN | 112637507 A | 4/2021 |
| CN | 113094135 A | 7/2021 |
| CN | 113110783 A | 7/2021 |
| CN | 113453056 A | 9/2021 |
| CN | 113457117 A | 10/2021 |
| CN | 113497888 A | 10/2021 |
| CN | 113535032 A | 10/2021 |
| CN | 113655999 A | 11/2021 |
| CN | 113721810 A | 11/2021 |
| CN | 114676358 A | 6/2022 |
| EP | 4113972 A1 | 1/2023 |
| WO | 2016017035 A1 | 2/2016 |

OTHER PUBLICATIONS

China National Intellectual Property Administration, Office Action Issued in Application No. 202210283956.1, Apr. 30, 2024, 15 pages.

China National Intellectual Property Administration, Office Action and Search Report Issued in Application No. 202210283956.1, Mar. 13, 2025, 8 pages.

European Patent Office, Extended European Search Report Issued in Application No. 23773611.1, Feb. 3, 2025, Germany, 10 pages.

He, C., "Key Technology of Water Environment Information Sharing Platform of Taihu Lake Basin and its Application for Jiangsu Province," Environmental Monitoring Management and Technology, vol. 12, No. 6, Dec. 25, 2009, 4 pages.

Japan Patent Office, Office Action Issued in Application No. 2024538078, Mar. 25, 2025, 8 pages.

* cited by examiner

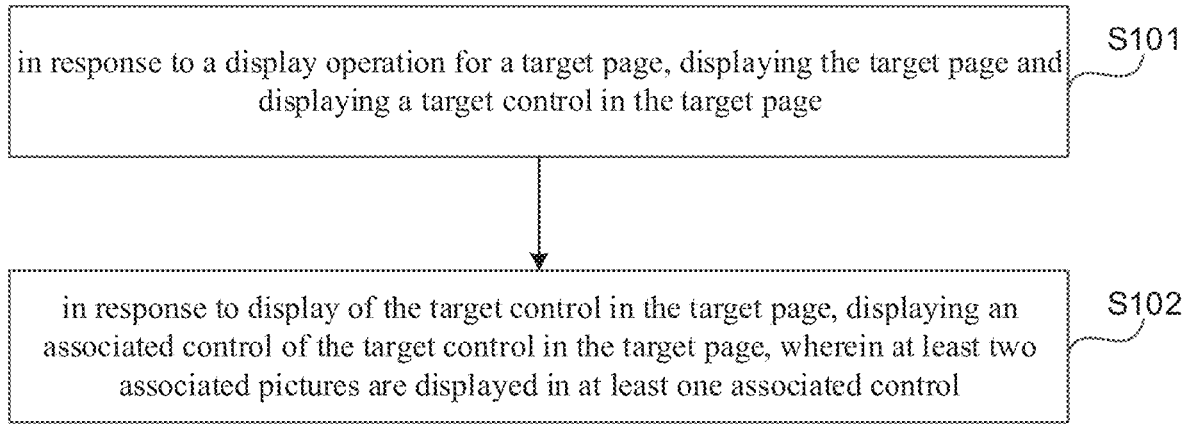
FIG. 1
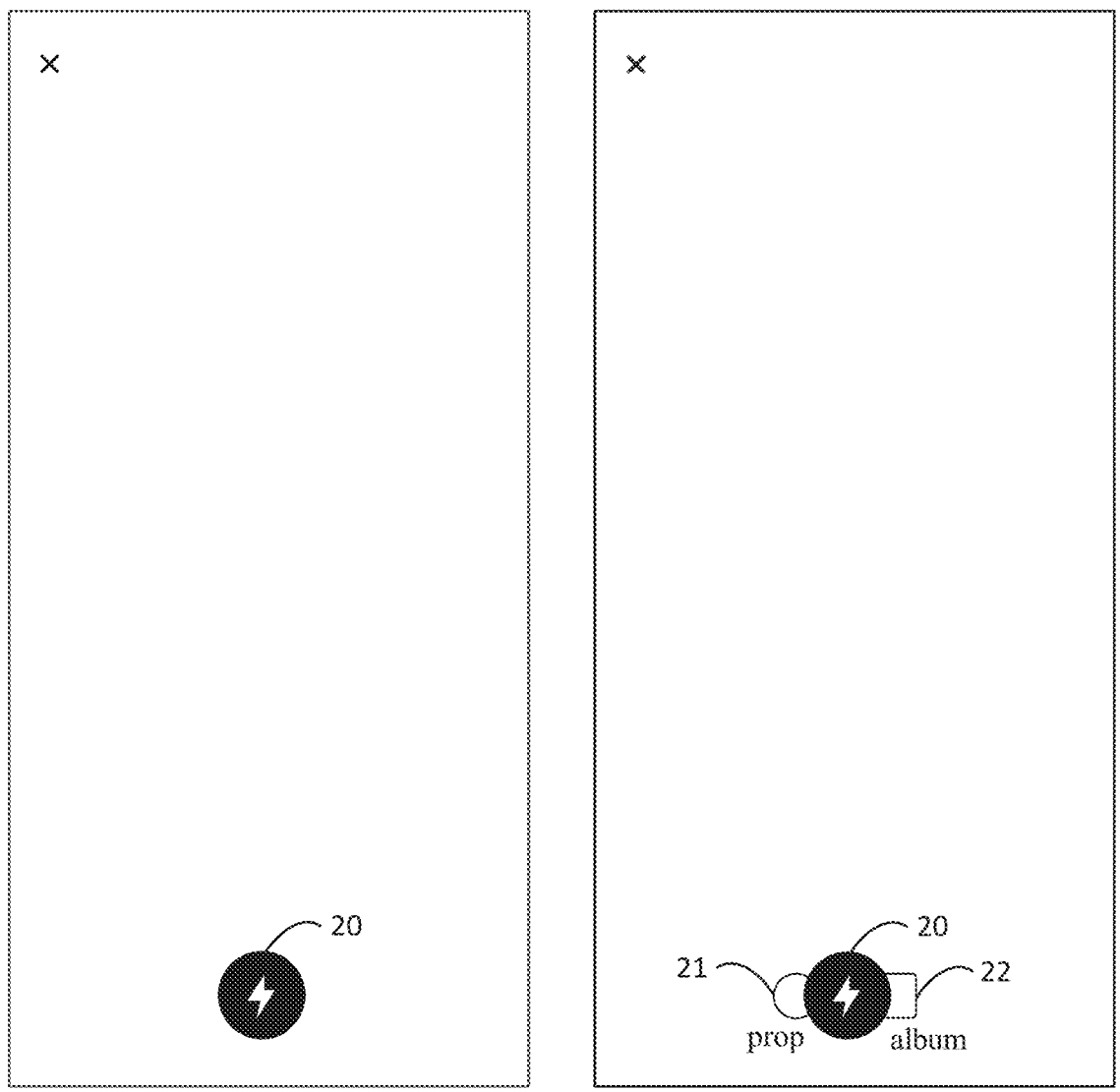
FIG. 2
FIG. 3

CONTROL DISPLAY METHOD AND APPARATUS, ELECTRONIC DEVICE, STORAGE MEDIUM, AND PROGRAM PRODUCT

CROSS-REFERENCE TO RELATED APPLICATIONS

This application is a continuation of International Patent Application No. PCT/CN2023/080281, filed on Mar. 8, 2023, which claims the priority to and benefits of Chinese patent application No. 202210283956.1, filed on Mar. 21, 2022. All the aforementioned patent applications are hereby incorporated by reference in their entireties.

TECHNICAL FIELD

The embodiments of the present disclosure relate to the field of computer technology, such as a display method of a control, an apparatus, an electronic device, a storage medium, and a program product.

BACKGROUND

At present, when displaying a capturing page, capturing controls and other controls can be displayed in the capturing page. However, in the related technologies, the display mode of controls in the capturing page is relatively humdrum, which leads to poor user experience.

SUMMARY

The embodiments of the present disclosure provide a display method of a control, an apparatus, an electronic device, a storage medium, and a program product, so as to enrich the display mode of the control in the capturing page.

In the first aspect, the embodiments of the present disclosure provide a display method of a control, including:
  in response to a display operation for a target page, displaying the target page and displaying a target control in the target page; and
  in response to display of the target control in the target page, displaying an associated control of the target control in the target page, wherein at least two associated pictures are displayed in at least one associated control.

In the second aspect, the embodiments of the present disclosure further provide a display apparatus of a control, including:
  a target control display module, configured to, in response to a display operation for a target page, display the target page and display a target control in the target page; and
  an associated control display module, configured to, in response to display of the target control in the target page, display an associated control of the target control in the target page, wherein at least two associated pictures are displayed in at least one associated control.

In the third aspect, the embodiments of the present disclosure further provide an electronic device, including:
  one or more processors; and
  a memory for storing one or more programs,
  when the one or more programs are executed by the one or more processors, the one or more processors implement the display method of the control provided by the embodiments of the present disclosure.

In the fourth aspect, the embodiments of the present disclosure further provide a computer-readable storage medium, on which a computer program is stored, when the computer program is executed by a processor, the computer program implements the display method of the control provided by the embodiments of the present disclosure.

In the fifth aspect, the embodiments of the present disclosure further provide a computer program product, when executed by a computer, the computer program product causes the computer to implement the display method of the control provided by the embodiments of the present disclosure.

BRIEF DESCRIPTION OF DRAWINGS

The above and other features, advantages and aspects of embodiments of the present disclosure will become more apparent by referring to the following detailed description when taken in conjunction with the accompanying drawings. Throughout the drawings, the same or similar reference numerals indicate the same or similar elements. It should be understood that the drawings are schematic, and the components and elements are not necessarily drawn to scale.

FIG. 1 is a flowchart of a display method of a control provided by an embodiment of the present disclosure;

FIG. 2 is a schematic display diagram of a target control provided by an embodiment of the present disclosure;

FIG. 3 is a schematic display diagram of an associated control provided by an embodiment of the present disclosure;

DETAILED DESCRIPTION

Figure 4:
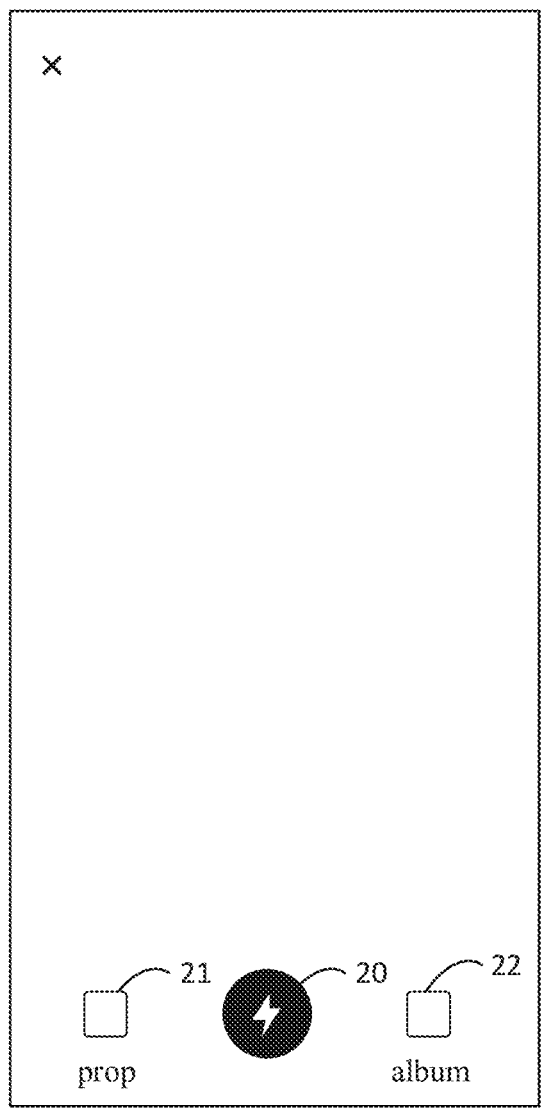
FIG. 4 is a display schematic diagram of an associated control provided by an embodiment of the present disclosure.

Embodiments of the present disclosure will be described in more detail below with reference to the accompanying drawings. Although some embodiments of the present disclosure are illustrated in the drawings, it should be understood that the present disclosure can be embodied in various forms and these embodiments are provided for a more thorough and complete understanding of the present disclosure. It should be understood that the drawings and embodiments of the present disclosure are only used for exemplary functions.

It should be understood that the steps described in the method implementations of the present disclosure can be performed in different orders and in parallel. Furthermore, the method implementations may include additional steps and/or omit to perform the illustrated steps.

As used herein, the terms "comprising" and "including" and their variants are open-ended comprising, that is, "comprising but not limited to". The term "based on" is "at least partially based on". The term "an embodiment" means "at least one embodiment"; the term "another embodiment" means "at least one other embodiment"; the term "some embodiments" means "at least some embodiments". Related definitions of other terms will be given in the following description.

It should be noted that the concepts of "first" and "second" mentioned in this disclosure are only used for distinguishing different apparatus, modules, or units, and are not used for limiting the order or interdependence of the functions performed by these apparatus, modules, or units.

It should be noted that the modifications of "a", "one" and "a plurality of" mentioned in this disclosure are schematic rather than limiting, and those skilled in the art should understand that unless the context clearly indicates otherwise, they should be understood as "one or more".

Names of messages or information exchanged among multiple apparatus in the implementations of the present disclosure are only used for illustrative purposes, but not used to limit the scope of these messages or information.

FIG. 1 is a flowchart of a display method of a control provided by an embodiment of the present disclosure. The method can be executed by a display apparatus of a control. The apparatus can be realized by software and/or hardware, can be configured in electronic device, and can be configured in a mobile phone or a tablet computer. The display method of the control provided by the embodiments of the present disclosure is suitable for scenarios of displaying the control, especially for scenarios of displaying the control on the capturing page. As illustrated in FIG. 1, the display method of the control provided by this embodiment may include following operations.

S101, in response to a display operation for a target page, displaying the target page, and displaying a target control in the target page.

In this embodiment, the display operation for the target page can be understood as a trigger operation for displaying the target page, such as a trigger operation for switching from other pages to the target page. The target page can be a page that needs to be displayed as indicated by the display operation, and the target control and at least one associated control of the target control can be set in the page. For example, the target page may be a capturing page, and the target control may be a capturing control in the capturing page for triggering the capturing of videos and/or pictures.

Alternatively, the target page can be displayed based on the display operation. For example, when the user wants to enter the target page, the user performs the display operation for the target page, such as triggering the corresponding control in the application software for indicating to enter the target page. Accordingly, when the electronic device detects the user's display operation for the target page, it can display the target page and display the target control 20 in the target page, as illustrated in FIG. 2.

S102, in response to the display of the target control in the target page, displaying an associated control of the target control in the target page, wherein at least two associated pictures are displayed in at least one associated control.

In this embodiment, the associated control may be a control that needs to be displayed in the target page when the target page is displayed, and is associated with the target control, such as a control for triggering execution functions to assist the target control to perform its corresponding function or corresponding to the target control. When the target control is a capturing control, for example, the associated control can be a prop control for triggering the display of a capturing prop list, a special effect control for triggering the display of a capturing special effect list, or an album control for triggering the display of pictures/videos stored in a user's album, and so on.

Optionally, when the target page is displayed, such as after the target control is displayed in the target page, the associated control of the target control can be displayed in the target page, and at least two associated pictures corresponding to the associated control can be exhibited in one or more associated controls, so as to enrich the display mode of the control.

In an implementation, displaying the associated control of the target control in the target page includes: controlling at least one associated control of the target control to move into the target page from the display position of the target control for display.

Optionally, after the target control is displayed in the target page, for example, after the target control is displayed in the target page for a preset length of time (such as 0.5 s, or 1 s, or the like), at least one associated control of the target control can be automatically controlled to move from the display position of the target control into the target page for display. For example, the associated control of the target control can be displayed at the bottom layer of the target control (that is, the associated control of the target control is obscured by the target control visually), and the associated control can be controlled to move to its corresponding display position. When it moves to the corresponding display position of the associated control, the associated control is controlled to stop moving so as to keep displaying the associated control of the target control at its corresponding display position.

In this embodiment, when the target page is displayed, after the target control is displayed, the associated control of the target control can be controlled to appear from the display position of the target control and move to its corresponding display position for display, instead of displaying the target control and the associated control of the target control in the target page simultaneously when displaying the target page (that is, the target control and the associated control of the target control appear in the target page at the same time), which can enrich the display mode of the control in the target page (such as the capturing page), and improve the use's experience.

Optionally, controlling at least one associated control of the target control to move into the target page for display from the display position of the target control includes at least one of the following: controlling the first associated control of the target control to move into the target page from the first display position of the target control along a first direction, and controlling the first associated control to continue to move to the first preset position of the target page for display along the first direction; or, controlling the second associated control of the target control to move into the target page from the second display position of the target control along a second direction, and controlling the second associated control to continue to move to the second preset position of the target page along the second direction for display.

In this embodiment, the first associated control and the second associated control are two associated controls of the target control. When the target control is a capturing control, the first associated control can be a prop control, for example, and the second associated control can be an album control, for example. The first direction may be the moving direction of the first associated control, the second direction may be the moving direction of the second associated control, and the first direction and the second direction may be the same or different. The following description takes that the first direction and the second direction are two opposite directions as an example. The first display position and the second display position are both the display position of the target control, and the first display position and the second display position may be the same or different. When the first display position and the second display position are different, the first display position can be, for example, the left boundary or right boundary of the target control, and the second display position can be, for example, the right boundary or left boundary of the target control. The first preset position can be understood as the preset display position of the first associated control in the target page. The second preset position can be understood as the preset display position of the second associated control in the target page, which may be different from the first preset position.

Taking that the first associated control and second associated control are controlled to move as an example, after the target control is displayed in the target page, the first associated control and second associated control can be controlled to move into the target page at the same time and continue to move in the target page until they move to the corresponding preset positions. That is, the first associated control is controlled to move into the target page from the first display position of the target control, and at the same time, the second associated control is controlled to move into the target page from the second display position of the target control; and the first associated control is continually controlled to move to the first preset position along the first direction, and at the same time, the first associated control is continually controlled to move to the second preset position along the second direction; and when the first associated control moves to the first preset position, the first associated control is not controlled to move, so as to keep displaying the first associated control at the first preset position, and when the second associated control moves to the second preset position, the second associated control is not controlled to move, so as to keep displaying the second associated control at the second preset position.

Taking that the target page is the capturing page, the target control 20 is the capturing control, the first associated control 21 is the prop control, and the second associated control 22 is the album control as an example, as illustrated in FIG. 3, it is feasible to simultaneously control the prop control to move into the capturing page from the left side of the capturing control and the album control to move into the capturing page from the right side of the capturing control, and the prop control is controlled to move to the left until the prop control moves to the first preset position, and the album control is controlled to move to the right until the album control moves to the second preset position, as illustrated in FIG. 4.

In addition, during the process of controlling the first associated control and the second associated control to move, the transparency of the first associated control and the second associated control can be gradually increased until the transparency of the first associated control and the second associated control is increased to a certain preset transparency.

It can be understood that after the target control is displayed in the target page, besides controlling the first associated control and the second associated control to simultaneously move into the target page and keep moving in the target page, the first associated control and the second associated control can also be controlled to move into the target page at different time and/or keep moving in the target page at different time. For example, the first associated control/the second associated control can be controlled to move into the target page and continue to move in the target page until the first associated control/the second associated control moves to the first preset position/second preset position; and after the first associated control/second associated control moves into the target page or moves to the first preset position/second preset position in the target page, the second associated control/first associated control is controlled to move into the target page and continue to move in the target page until the second associated control/first associated control moves to the second preset position/first preset position.

In the above implements, when the second associated control is initially displayed, such as when the second associated control is initially moved into the target page, the preset pattern can be only displayed in the second associated control; during the process of moving the second associated control or after moving to the second preset position, the preset pattern displayed in the second associated control can be switched to at least two associated pictures corresponding to the second associated control, for example, the display of the preset pattern is cancelled, and at least two associated pictures corresponding to the second associated control are displayed in a stacked form in the second associated control, so as to enrich the display mode of the second associated control. At this time, controlling the second associated control to continue to move to the second preset position of the target page for display along the second direction may include: switching the preset pattern displayed in the second associated control to at least two associated pictures corresponding to the second associated control, wherein the at least two associated pictures are displayed in a stacked form.

In this embodiment, the preset pattern may be a preset pattern that is irrelevant to the content displayed after the second associated control is triggered. The associated picture can be a pattern associated with the second associated control, such as a pattern associated with the content displayed after the second control is triggered. Optionally, the second associated control is used to trigger the display of a target picture, and the target picture includes the at least two associated pictures. That is, when the second associated control is an album control, the at least two associated pictures can be thumbnails of pictures in the album displayed after the second associated control is triggered, such as thumbnails of the latest captured pictures in the album and/or thumbnails of the covers of the latest captured videos in the album.

In another implement, displaying the associated control of the target control in the target page includes: displaying a third associated control of the target control at a third preset position of the target page, wherein the third associated control contains at least two associated pictures; and controlling at least one associated picture to rotate, so as to exhibit the at least two associated pictures.

In this embodiment, the third associated control may be the associated control of the target control, and the third associated control and the second associated control can be the same controls or different controls. The third preset position can be understood as the preset display position of the third associated control in the target page. When the third associated control and the second associated control are the same control, the third preset position can be the same as the second preset position. When the third associated control is different from the second associated control, the third preset position can be the same as or different from the second preset position, for example, the second associated control and the third associated control can be switched to display at the same preset position according to the set switching conditions.

In the above solutions, the third associated control can be displayed directly at the third preset position of the target page without controlling the third associated control to move. For example, at least two associated pictures corresponding to the third related control are displayed in the third related control, or a preset pattern is displayed in the third related control, and the preset pattern is switched to at least two associated pictures corresponding to the third related control. Then, at least one associated picture is controlled to rotate. Taking two associated pictures as an example, the associated picture at the lower layer can be controlled to rotate counterclockwise by a preset angle (such as 10 degrees) along one of its own edges (such as the edge parallel to the lower boundary of the target page and closer to the lower boundary), and/or, the associated picture at the upper layer can be controlled to rotate clockwise by a preset angle along one of its own edges, so as to display respective associated pictures.

It can be understood that when the included angle between the at least two associated pictures is increased to a preset angle, the associated pictures can also be controlled to rotate clockwise or counterclockwise at the same time, so that users can view the associated pictures completely.

In the display method of the control provided by this embodiment, in response to the display operation for the target page, the target page is displayed, and the target control is displayed in the target page; in response to the display of the target control in the target page, the associated control of the target control is displayed in the target page, wherein at least two associated pictures are displayed in at least one associated control. By adopting the above technical solutions, this embodiment displays the associated picture of the target control after displaying the target control, and displays the associated pictures of the control in the associated control, which can enrich the display mode of the control in the page and improve the user experience.

Figure 5:
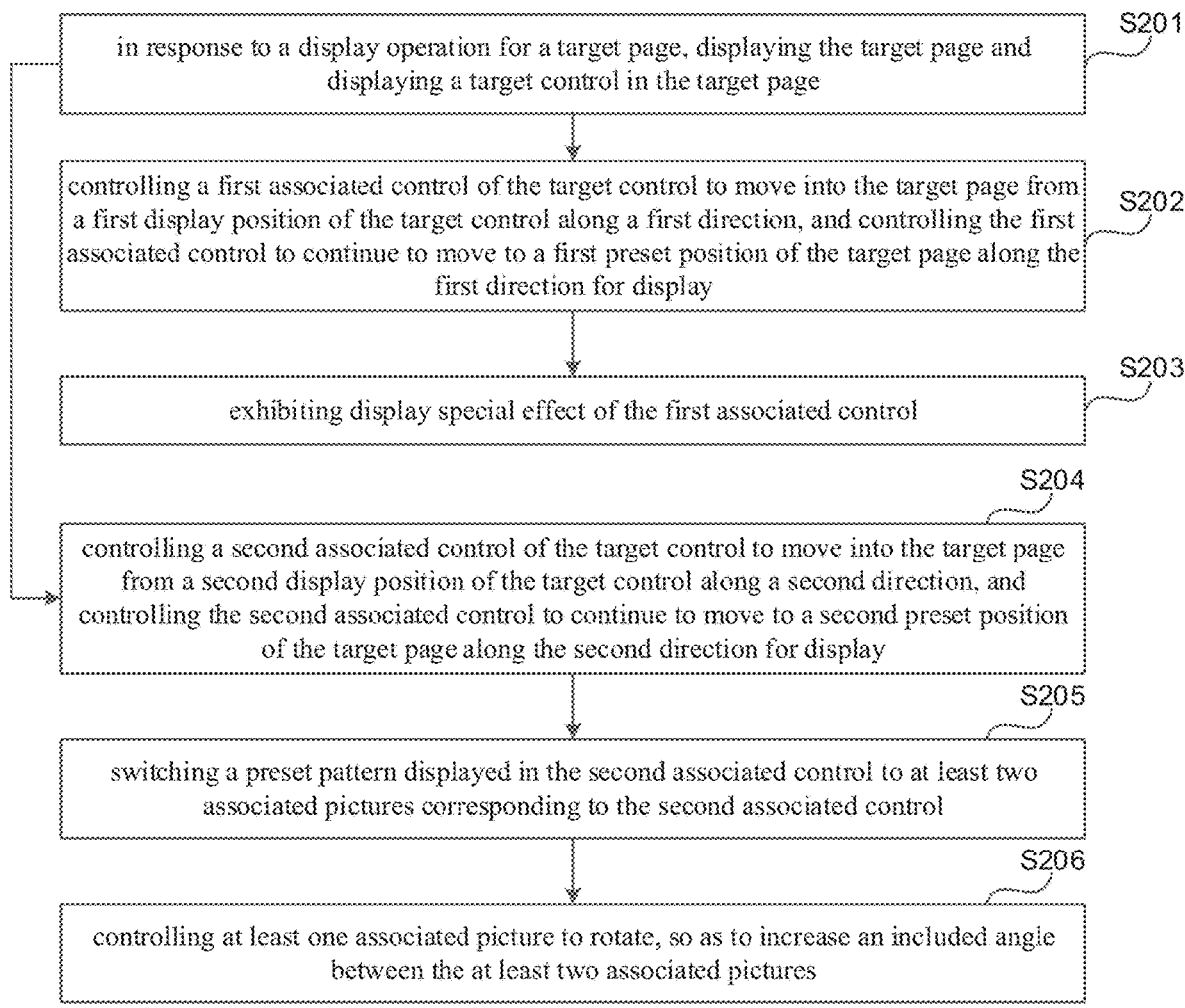
FIG. 5 is a flowchart of a display method of a control provided by an embodiment of the present disclosure.

FIG. 5 is a flowchart of another display method of a control provided by an embodiment of the present disclosure. The solution in this embodiment can be combined with one or more alternative solutions in the above embodiments. Optionally, after controlling the first associated control to move to the first preset position of the target page along the first direction for display, the display method of the control provided by this embodiment further comprises: exhibiting the display special effect of the first associated control.

Optionally, controlling the second associated control to continue to move to the second preset position of the target page along the second direction for display includes: switching the preset pattern displayed in the second associated control to at least two associated pictures corresponding to the second associated control; and controlling at least one associated picture to rotate, so as to increase the included angle between the at least two associated pictures.

Accordingly, as illustrated in FIG. 5, the display method of the control provided by this embodiment may include following operations.

S201, in response to a display operation for a target page, displaying the target page and displaying a target control in the target page, and performing S202 and/or S204.

S202, controlling the first associated control of the target control to move into the target page along a first direction from the first display position of the target control, and controlling the first associated control to continue to move to the first preset position of the target page along the first direction for display.

S203, exhibiting the display special effect of the first associated control, and ending the operation.

In this embodiment, after controlling the first associated control to move to the first preset position, the display special effects of the first associated control can also be exhibited, so as to enrich the exhibition forms of the first associated control.

In this embodiment, the display special effects of the first associated control can be flexibly set. For example, the display special effects of the first associated control can include zoom special effects and animation special effects. For example, after the first associated control moves to the first preset position, it can be controlled to zoom the first associated control continuously for a preset number of times (such as two or three times), and after zooming, the animation special effects (such as sweep away thoroughly special effects) corresponding to the first associated control can be played on the upper layer of the first associated control (such as the upper layer of the display area where the first associated control is located). In this case, exhibiting the display special effects of the first associated control may include: controlling the first associated control to zoom, and playing the preset animation special effects of the first associated control on the upper layer of the first associated control after zooming.

In addition, during the process of the first associated control 21 moving from the first display position to the first preset position, or after the first associated control 21 moves to the first preset position, the display style of the first associated control 21 can also be switched, such as switching the shape of the first associated control 21 and/or switching the content displayed in the first associated control 21. For example, when the first associated control 21 is initially displayed, the control icon of the first associated control 21 can be displayed in a circle shape (as illustrated in FIG. 3) and a default pattern is displayed in the control icon of the first associated control 21. During the process of the first associated control 21 moving from the first display position to the first preset position, or after the first associated control 21 moves to the first preset position, the control icon of the first associated control 21 can be switched from a circle to a rectangle (as illustrated in FIG. 4), and the pattern displayed in the control icon of the first associated control 21 can be switched to a picture associated with the first associated control 21, such as when the first associated control 21 is a prop control, the pattern displayed in the control icon of the first associated control 21 can be switched to a prop picture of a certain capturing prop in the capturing prop list displayed after the first associated control 21 is triggered.

S204, controlling the second associated control of the target control to move into the target page along a second direction from the second display position of the target control, and controlling the second associated control to continue to move to the second preset position of the target page along the second direction.

S205, switching the preset pattern displayed in the second associated control to at least two associated pictures corresponding to the second associated control.

Optionally, during the process of controlling the second associated control to move to the second preset position or after the second associated control moves to the second preset position, at least two associated pictures of the second associated control can be obtained and displayed in a stacked form. For example, when the at least two associated pictures are displayed, the display sizes of respective associated pictures may be the same or different. When the at least two associated pictures are displayed in a stacked form, the at least two associated pictures can be arranged parallel to the plane where the screen of the electronic device is located, that is, the at least two associated pictures can present a visual effect parallel to the plane where the screen of the electronic device is located.

S206, controlling at least one associated picture to rotate, so as to increase the included angle between the at least two associated pictures.

In this embodiment, the included angle between the at least two associated pictures can be understood as the included angle between the planes where the at least two pictures are located.

Figure 6:
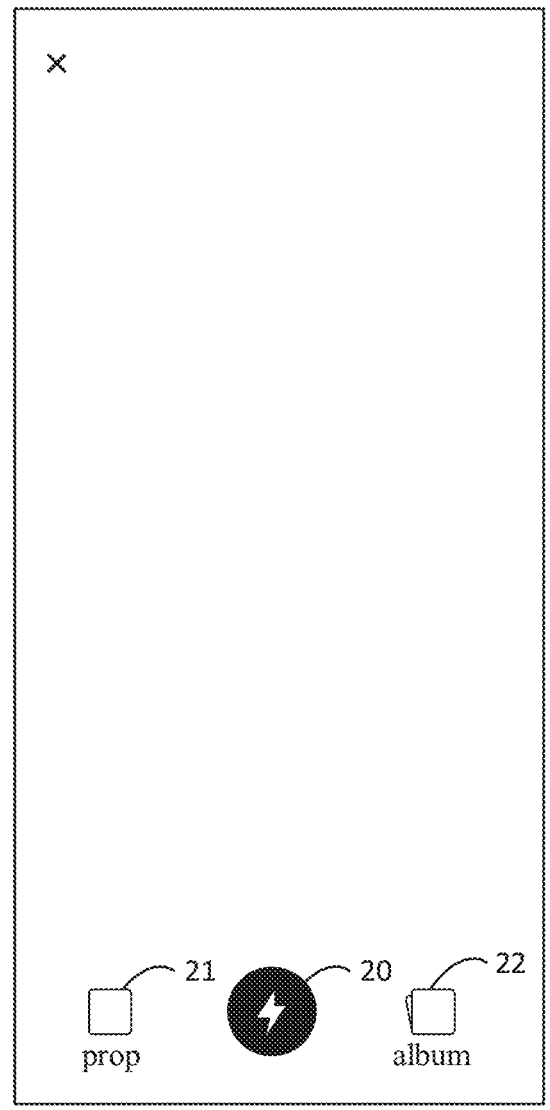
FIG. 6 is a schematic display diagram of an associated control provided by an embodiment of the present disclosure.

For example, when certain conditions are met, such as when the associated pictures displayed in the second associated control 22 are displayed at the second preset position for a preset time, at least one associated picture can be controlled to rotate to increase the included angle between the at least two associated pictures. Taking that two associated pictures are displayed in the second associated control 22 as an example, before the rotation, one associated picture can be located at the lower layer of the other associated picture and the two associated pictures present a visual effect that is parallel to each other (for example, one associated picture is completely blocked by the other associated picture). When rotating, for example, the associated picture located in the lower layer can be controlled to rotate counterclockwise by a preset angle (such as 10 degrees, etc.) along one of its own edges (such as the edge parallel to the lower boundary of the target page and closer to the lower boundary of the target page), as illustrated in FIG. 6 (the image in the picture is not illustrated in the figure), and/or, the associated picture located in the upper layer can be controlled to rotate clockwise by a preset angle along one of its own edges, so as to increase the included angle between the two pictures.

It can be understood that when the included angle between the at least two associated pictures is increased to a preset angle, the associated pictures can also be controlled to rotate clockwise or counterclockwise at the same time, so that users can view the respective associated pictures completely.

In the display method of the control provided by this embodiment, the display special effects of the first associated control is exhibited after the first associated control moves to the first preset position, and the preset picture displayed in the second associated control is switched to at least two associated pictures corresponding to the second associated control, and at least one associated picture is controlled to rotate, so as to increase the included angle between the at least two associated pictures, which can enrich the display mode of the control in the page and improve the display effect of the control.

Figure 7:
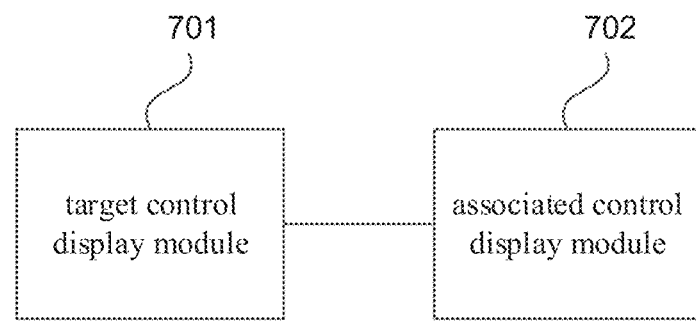
FIG. 7 is a structural block diagram of a display apparatus of a control provided by an embodiment of the present disclosure.

FIG. 7 is a structural block diagram of a display apparatus of a control provided by an embodiment of the present disclosure. The apparatus can be realized by software and/or hardware, can be configured in electronic device, can be configured in a mobile phone or a tablet computer, and can display the control by executing the display method of the control. As illustrated in FIG. 7, the display apparatus of the control provided by this embodiment may include: a target control display module 701 and an associated control display module 702.

The target control display module 701 is configured to, in response to a display operation for a target page, display the target page and display a target control in the target page.

The associated control display module 702 is configured to, in response to the display of the target control in the target page, display the associated control of the target control in the target page. At least two associated pictures are exhibited in at least one associated control.

In the display apparatus of the control provided by this embodiment, the target control display module 701 displays a target page and displays the target control in the target page in response to the display operation for the target page; the associated control display module 702, in response to displaying the target control in the target page, displays the associated control of the target control in the target page. At least two associated pictures are displayed in at least one associated control. By adopting the above technical solutions, this embodiment displays the associated picture of the target control after displaying the target control, and displays the associated picture of the control in the associated control, which can enrich the display mode of the control in the page and improve the user's experience.

In the above solutions, the associated control display module 702 can be configured to display the associated control of the target control in the target page through the following ways: controlling at least one associated control of the target control to move into the target page from the display position of the target control for display.

In the above solutions, the associated control display module 702 may include: a first display unit, configured to control the first associated control of the target control to move into the target page along a first direction from the first display position of the target control, and control the first associated control to continue to move to the first preset position of the target page along the first direction for display; and/or, a second display unit, configured to control the second associated control of the target control to move into the target page along a second direction from the second display position of the target control, and control the second associated control to continue to move to a second preset position of the target page along the second direction for display.

In the above solutions, the second display unit may be further configured to: exhibit the display special effect of the first associated control after controlling the first associated control to continue to move to the first preset position of the target page along the first direction for display.

In the above solutions, the second display unit can be configured to control the first associated control to zoom, and play the preset animation special effects of the first associated control on the upper layer of the first associated control after zooming.

In the above solutions, the first display unit may be configured to: switch the preset pattern displayed in the second associated control to at least two associated pictures corresponding to the second associated control, wherein the at least two associated pictures are displayed in a stacked form.

In the above solutions, the first display unit may be configured to: switch the preset pattern displayed in the second associated control to at least two associated pictures corresponding to the second associated control, and control at least one associated picture to rotate, so as to increase the included angle between the at least two associated pictures.

In the above solutions, the associated control display module 702 can be configured to: display the third associated control of the target control at the third preset position of the target page, wherein the third associated control contains at least two associated pictures; and control at least one associated picture to rotate, so as to exhibit the at least two associated pictures.

The display apparatus of the control provided by the embodiments of the present disclosure can execute the display method of the control provided by any embodiment of the present disclosure, and has corresponding functional modules and beneficial effects for executing the display method of the control. For technical details not described in detail in this embodiment, the display method of the control provided by any embodiment of the disclosure can be referred to.

Hereinafter, referring to FIG. 8, it illustrates a schematic structural diagram of an electronic device (such as a terminal device) 800 suitable for implementing the embodiments of the present disclosure. The terminal device in the embodiments of the present disclosure may include a mobile terminal such as a mobile phone, a laptop, a digital broadcast receiver, a personal digital assistant (PDA), a portable android device (PAD), a portable multimedia player (PMP), a vehicle-mounted terminal (e.g., a vehicle-mounted navigation terminal), etc., and a stationary terminal such as a digital television (TV), a desktop computer, etc. The electronic device illustrated in FIG. 8 is only an example.

Figure 8:
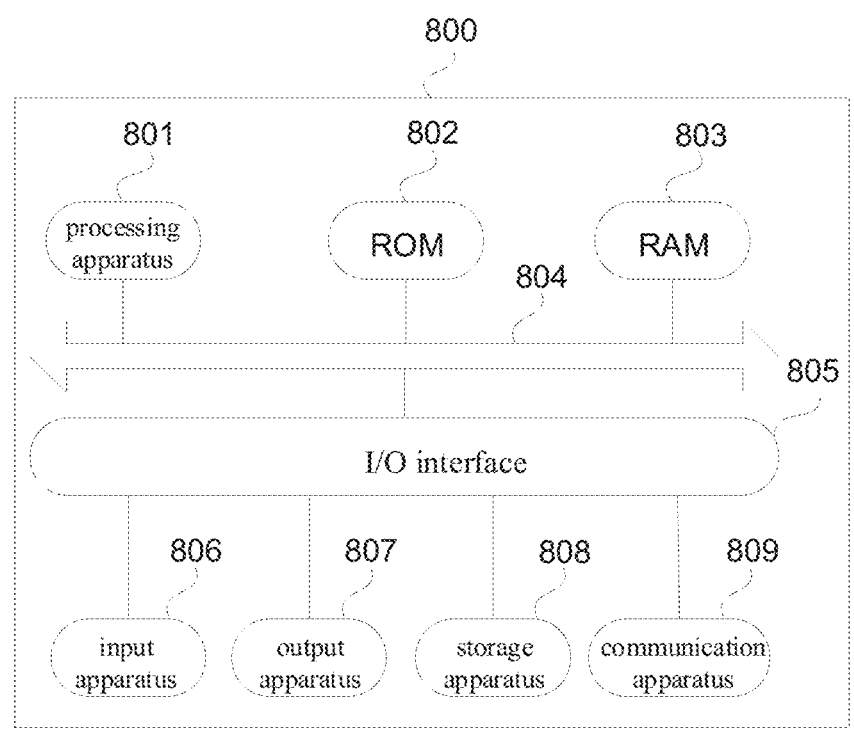
FIG. 8 is a schematic structural diagram of an electronic device provided by an embodiment of the present disclosure.

As illustrated in FIG. 8, the electronic device 800 may include a processing apparatus (e.g., a central processing unit, a graphics processing unit, etc.) 801, which may execute various appropriate actions and processing according to a program stored in a read-only memory (ROM) 802 or a program loaded from a storage apparatus 808 into a random access memory (RAM) 803. The RAM 803 further stores various programs and data required for operation of the electronic device 800. The processing apparatus 801, the ROM 802, and the RAM 803 are connected with each other through a bus 804. An input/output (I/O) interface 805 is also coupled to the bus 804.

Usually, apparatuses below may be coupled to the I/O interface 805: input apparatuses 806 including, for example, a touch screen, a touch pad, a keyboard, a mouse, a camera, a microphone, an accelerometer, a gyroscope, etc.; output apparatuses 807 including, for example, a liquid crystal display (LCD), a speaker, a vibrator, etc.; storage apparatuses 808 including, for example, a magnetic tape, a hard disk, etc.; and a communication apparatus 809. The communication apparatus 809 may allow the electronic device 800 to perform wireless or wired communication with other device to exchange data. Although FIG. 8 illustrates the electronic device 800 including various apparatuses, it should be understood that it is not required to implement or have all the apparatuses illustrated, and the electronic device may alternatively implement or have more or fewer apparatuses.

Specially, according to the embodiments of the present disclosure, the process described above with reference to the flow chart may be implemented as computer software programs. For example, the embodiments of the present disclosure provide a computer program product, which includes a computer program carried on a non-transitory computer readable medium, and the computer program includes program codes for executing the method illustrated in the flow charts. In such embodiments, the computer program may be downloaded and installed from the network via the communication apparatus 809, or installed from the storage apparatus 808, or installed from the ROM 802. When executed by the processing apparatus 801, the computer program may execute the above-described functions defined in the method provided by the embodiments of the present disclosure.

It should be noted that the above-mentioned computer-readable medium in the present disclosure may be a computer-readable signal medium or a computer-readable storage medium or any combination thereof. For example, the computer-readable storage medium may be an electric, magnetic, optical, electromagnetic, infrared, or semiconductor system, apparatus or device, or any combination thereof. The computer-readable storage medium may include: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: in response to a display operation for a target page, display the target page and display a target control in the target page; and in response to display of the target control in the target page, display an associated control of the target control in the target page, wherein at least two associated pictures are displayed in at least one associated control.

The computer program codes for performing the operations of the present disclosure may be written in one or more programming languages or a combination thereof. The above-mentioned programming languages include object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes an electrical, magnetic, optical, electromagnetic, infrared, or semi-conductive system, apparatus or device, or any suitable combination of the foregoing. Examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, example 1 provides a display method of a control, including:
  in response to a display operation for a target page, displaying the target page and displaying a target control in the target page; and
  in response to display of the target control in the target page, displaying an associated control of the target control in the target page, wherein at least two associated pictures are displayed in at least one associated control.

According to one or more embodiments of the present disclosure, in the method of example 2 according to example 1, displaying the associated control of the target control in the target page comprises:
  controlling at least one associated control of the target control to move into the target page from a display position of the target control for display.

According to one or more embodiments of the present disclosure, in the method of example 3 according to example 2, controlling the at least one associated control of the target control to move into the target page from the display position of the target control for display comprises at least one of:
  controlling a first associated control of the target control to move into the target page from a first display position of the target control along a first direction, and controlling the first associated control to continue to move to a first preset position of the target page along the first direction for display; or
  controlling a second associated control of the target control to move into the target page from a second display position of the target control along a second direction, and controlling the second associated control to continue to move to a second preset position of the target page along the second direction for display.

According to one or more embodiments of the present disclosure, in the method of example 4 according to example 3, after controlling the first associated control to continue to move to the first preset position of the target page along the first direction for display, the method further comprises:
  exhibiting display special effect of the first associated control.

According to one or more embodiments of the present disclosure, in the method of example 5 according to example 4, exhibiting the display special effect of the first associated control comprises:
  controlling the first associated control to zoom, and playing preset animation special effect of the first associated control on an upper layer of the first associated control after zooming is completed.

According to one or more embodiments of the present disclosure, in the method of example 6 according to example 3, controlling the second associated control to continue to move to the second preset position of the target page along the second direction for display comprises:
  switching a preset pattern displayed in the second associated control to at least two associated pictures corresponding to the second associated control, wherein the at least two associated pictures are displayed in a stacked form.

According to one or more embodiments of the present disclosure, in the method of example 7 according to example 3, controlling the second associated control to continue to move to the second preset position of the target page along the second direction for display comprises:

switching a preset pattern displayed in the second associated control to at least two associated pictures corresponding to the second associated control; and controlling at least one associated picture to rotate, so as to increase an included angle between the at least two associated pictures.

According to one or more embodiments of the present disclosure, in the method of example 8 according to example 1, displaying the associated control of the target control in the target page comprises:

displaying a third associated control of the target control at a third preset position of the target page, wherein the third associated control contains at least two associated pictures; and controlling at least one associated picture to rotate, so as to exhibit the at least two associated pictures.

According to one or more embodiments of the present disclosure, example 9 provides a display apparatus of a control, comprising:

a target control display module, configured to, in response to a display operation for a target page, display the target page and display a target control in the target page; and an associated control display module, configured to, in response to display of the target control in the target page, display an associated control of the target control in the target page, wherein at least two associated pictures are displayed in at least one associated control.

According to one or more embodiments of the present disclosure, example 10 provides an electronic device, comprising:

one or more processors; and a memory for storing one or more programs, when the one or more programs are executed by the one or more processors, the one or more processors implement the display method of the control provided by any of the examples 1-8.

According to one or more embodiments of the present disclosure, example 11 provides a computer-readable storage medium, on which a computer program is stored, when the computer program is executed by a processor, the computer program implements the display method of the control provided by any of the examples 1-8.

According to one or more embodiments of the present disclosure, example 12 provides a computer program product, when executed by a computer, the computer program product causes the computer to implement the display method of the control provided by any of the examples 1-8.

The invention claimed is:

1. A display method of a control, comprising:
   in response to a display operation for a target page, displaying the target page and displaying a target control in the target page; and
   in response to display of the target control in the target page, displaying an associated control of the target control in the target page, wherein at least two associated pictures are displayed in at least one associated control,
   wherein displaying the associated control of the target control in the target page comprises:
      controlling a first associated control of the target control to move into the target page from a first display position of the target control along a first direction, and controlling the first associated control to continue to move to a first preset position of the target page along the first direction for display; or
      controlling a second associated control of the target control to move into the target page from a second display position of the target control along a second direction, and controlling the second associated control to continue to move to a second preset position of the target page along the second direction for display, and
   wherein controlling the second associated control to continue to move to the second preset position of the target page along the second direction for display comprises:
      switching a preset pattern displayed in the second associated control to at least two associated pictures corresponding to the second associated control, wherein the at least two associated pictures are displayed in a stacked form, or at least one associated picture is controlled to rotate, so as to increase an included angle between the at least two associated pictures.

2. The method according to claim 1, wherein, after controlling the first associated control to continue to move to the first preset position of the target page along the first direction for display, the method further comprises:
   exhibiting display special effect of the first associated control.

3. The method according to claim 2, wherein exhibiting the display special effect of the first associated control comprises:
   controlling the first associated control to zoom, and playing preset animation special effect of the first associated control on an upper layer of the first associated control after zooming is completed.

4. The method according to claim 1, wherein displaying the associated control of the target control in the target page comprises:
   displaying a third associated control of the target control at a third preset position of the target page, wherein the third associated control contains at least two associated pictures; and
   controlling at least one associated picture to rotate, so as to exhibit the at least two associated pictures.

5. A display apparatus of a control, comprising:
   a target control display module, configured to, in response to a display operation for a target page, display the target page and display a target control in the target page; and
   an associated control display module, configured to, in response to display of the target control in the target page, display an associated control of the target control in the target page, wherein at least two associated pictures are displayed in at least one associated control,
   wherein displaying the associated control of the target control in the target page comprises:
      controlling a first associated control of the target control to move into the target page from a first display position of the target control along a first direction, and controlling the first associated control to continue to move to a first preset position of the target page along the first direction for display; or
      controlling a second associated control of the target control to move into the target page from a second display position of the target control along a second direction, and controlling the second associated control to continue to move to a second preset position of the target page along the second direction for display, and wherein controlling the second associated control to continue to move to the second preset position of the target page along the second direction for display comprises:
switching a preset pattern displayed in the second associated control to at least two associated pictures corresponding to the second associated control, wherein the at least two associated pictures are displayed in a stacked form, or at least one associated picture is controlled to rotate, so as to increase an included angle between the at least two associated pictures.

6. An electronic device, comprising:
at least one processor; and
a memory communicatively connected to the at least one processor,
wherein the memory stores a computer program executable by the at least one processor, and the computer program is executed by the at least one processor, so that the at least one processor is capable of executing a display method of a control,
wherein the display method of the control comprises:
in response to a display operation for a target page, displaying the target page and displaying a target control in the target page; and
in response to display of the target control in the target page, displaying an associated control of the target control in the target page, wherein at least two associated pictures are displayed in at least one associated control;
wherein displaying the associated control of the target control in the target page comprises:
controlling a first associated control of the target control to move into the target page from a first display position of the target control along a first direction, and controlling the first associated control to continue to move to a first preset position of the target page along the first direction for display; or
controlling a second associated control of the target control to move into the target page from a second display position of the target control along a second direction, and controlling the second associated control to continue to move to a second preset position of the target page along the second direction for display, and
wherein controlling the second associated control to continue to move to the second preset position of the target page along the second direction for display comprises:
switching a preset pattern displayed in the second associated control to at least two associated pictures corresponding to the second associated control, wherein the at least two associated pictures are displayed in a stacked form, or at least one associated picture is controlled to rotate, so as to increase an included angle between the at least two associated pictures.

7. The electronic device according to claim 6, wherein, after controlling the first associated control to continue to move to the first preset position of the target page along the first direction for display, the method further comprises:
exhibiting display special effect of the first associated control.

8. The electronic device according to claim 7, wherein exhibiting the display special effect of the first associated control comprises:
controlling the first associated control to zoom, and playing preset animation special effect of the first associated control on an upper layer of the first associated control after zooming is completed.

9. The electronic device according to claim 6, wherein displaying the associated control of the target control in the target page comprises:
displaying a third associated control of the target control at a third preset position of the target page, wherein the third associated control contains at least two associated pictures; and
controlling at least one associated picture to rotate, so as to exhibit the at least two associated pictures.

10. A non-transitory computer-readable storage medium, wherein the non-transitory computer-readable storage medium stores computer instructions, and the computer instructions are configured to, when executed by a processor, implement the display method of the control according to claim 1.

* * * * *